Jan. 27, 1970     R. J. EBBERT ET AL     3,491,718
SYSTEM FOR CONTROLLING SEQUENTIAL OPERATIONS
Filed July 12, 1968     4 Sheets-Sheet 1
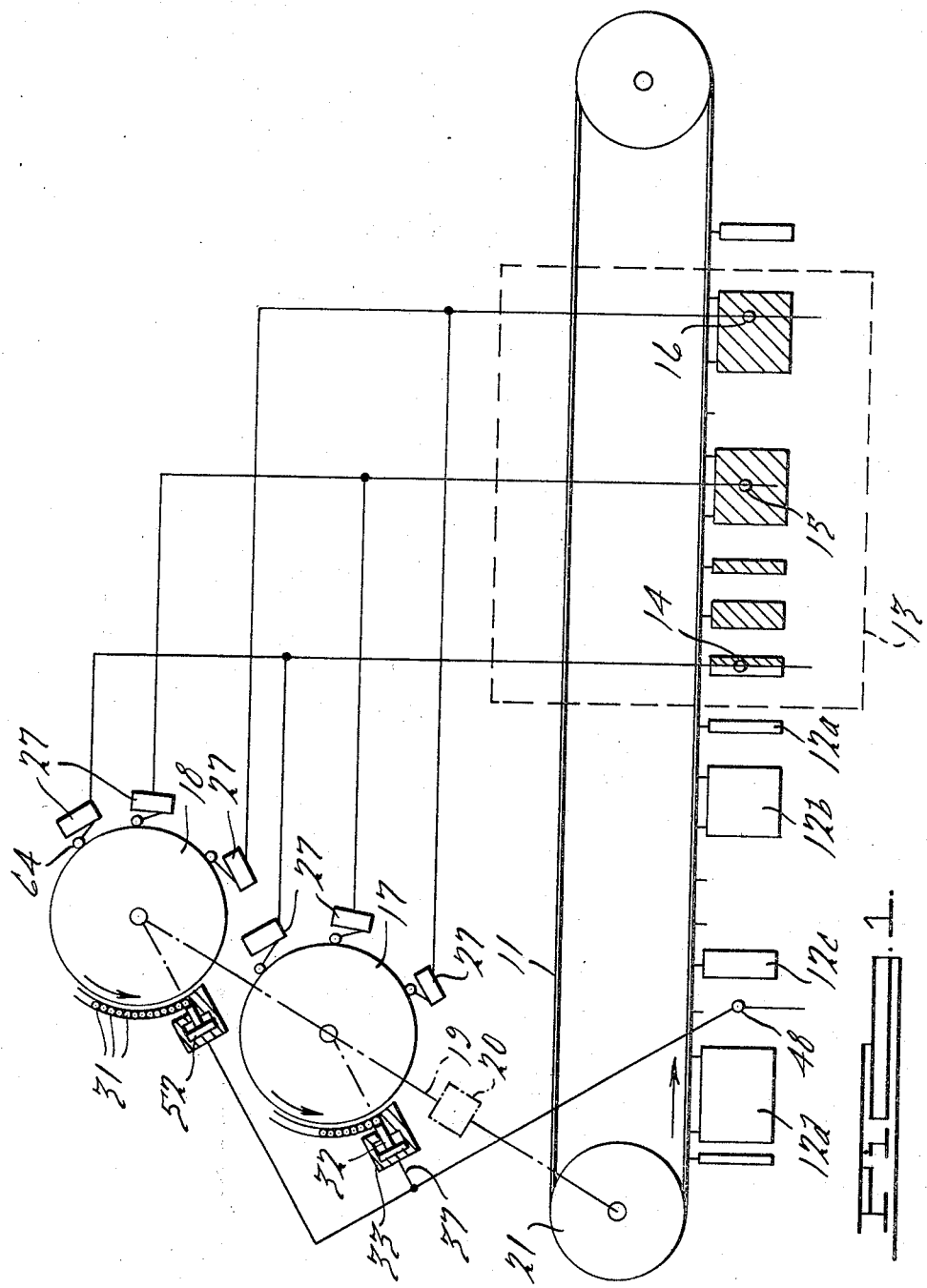
INVENTORS.
Robert J. Ebbert
William R. McBride
Harness, Dickey & Pierce
ATTORNEYS

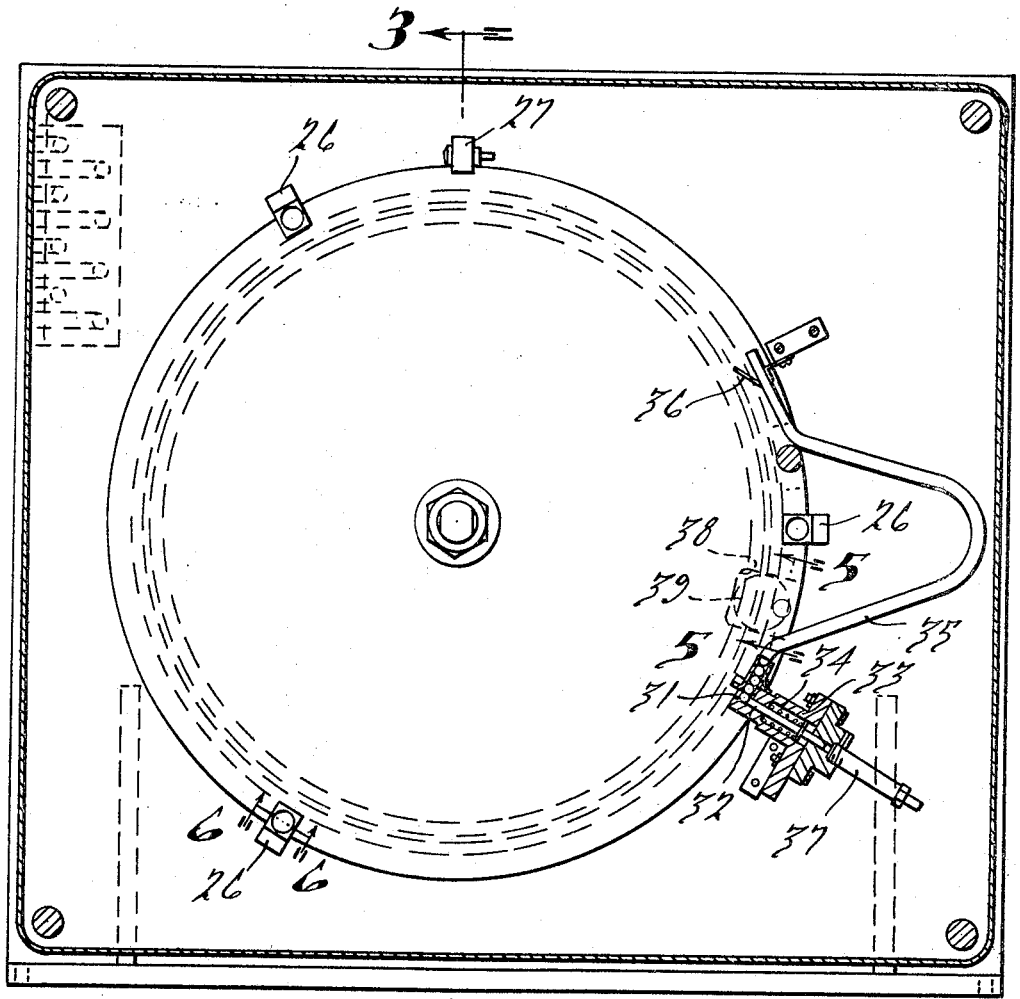

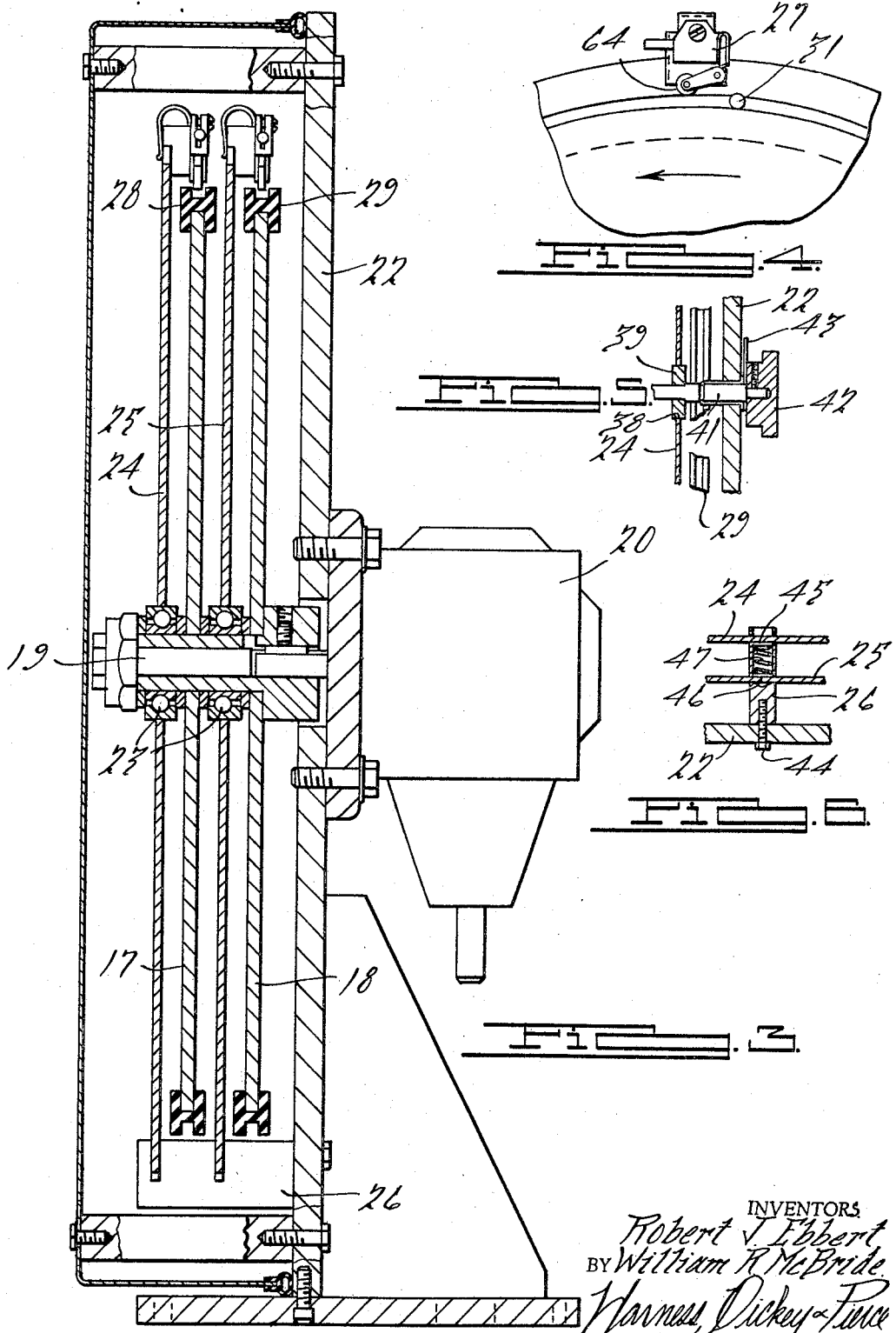

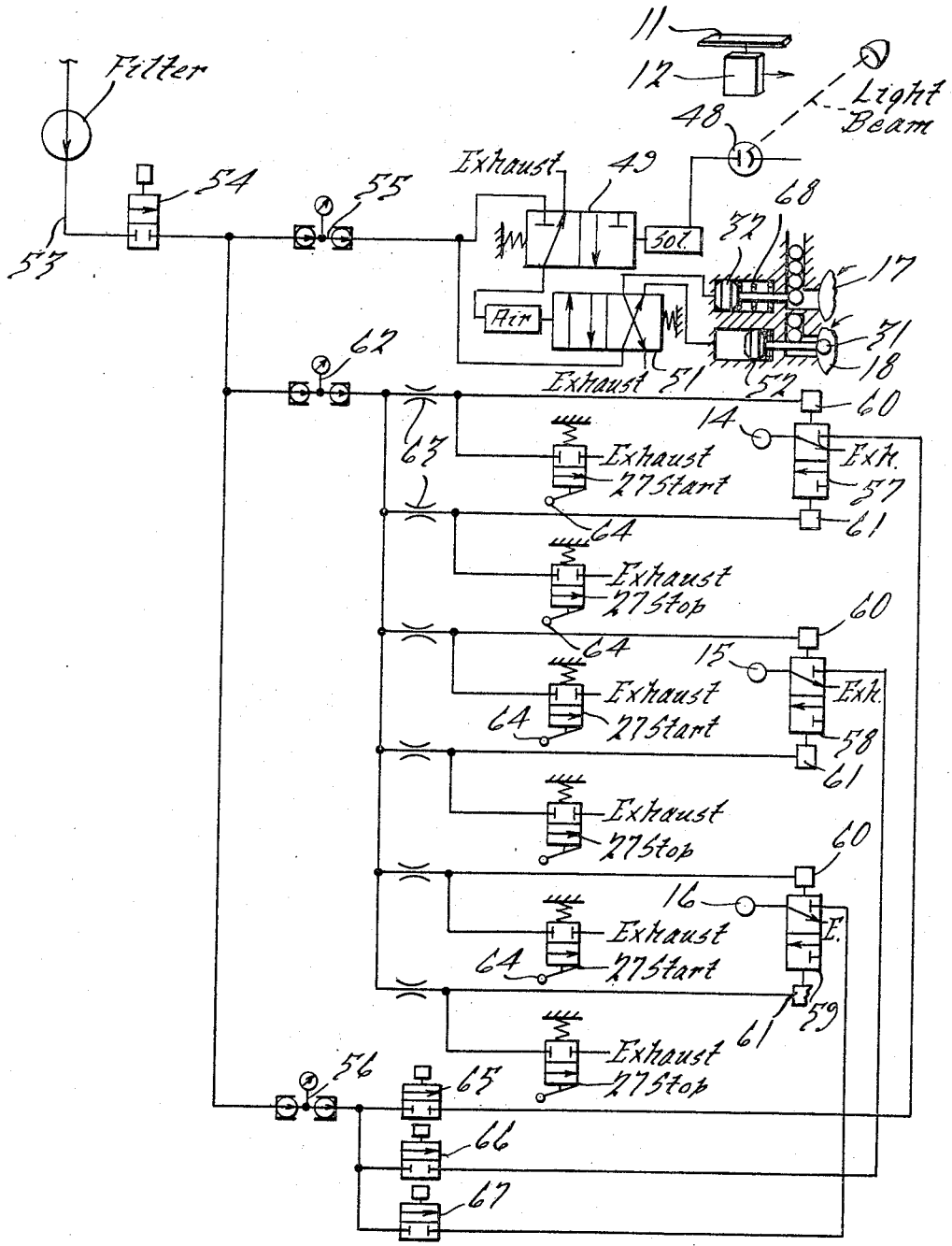

United States Patent Office 3,491,718
Patented Jan. 27, 1970

1

3,491,718
SYSTEM FOR CONTROLLING SEQUENTIAL OPERATIONS
Robert J. Ebbert and William R. McBride, Rochester, Mich., assignors to Ebbert Engineering Company, Troy, Mich., a corporation of Michigan
Filed July 12, 1968, Ser. No. 744,477
Int. Cl. B05c *11/12*
U.S. Cl. 118—2   5 Claims

ABSTRACT OF THE DISCLOSURE

A pair of timing discs are geared to a conveyor carrying parts into a spray booth. As the leading and trailing edges of the part pass a photoelectric cell, balls are inserted into the disc rims and actuate pneumatic switches to control the spray guns.

BACKGROUND OF THE INVENTION

Field of the invention

The invention relates to analogue memory systems for controlling sequential operations in timed relation with the movement and size of parts being subjected to these operations, and is particularly adapted for operations in which there are explosive atmospheres such as paint spray booths.

Description of the prior art

Patent No. 3,274,852 to Robert J. Ebbert, dated Sept. 27, 1966 and entitled "Ball Track Timing Device," shows a ball and disc type timing unit in which electrical switches are actuated in timed relatiton with the movement of a conveyor.

SUMMARY OF THE INVENTION

According to the invention, two such ball and disc type timing units are coaxially mounted and rotated synchronously with a conveyor carrying workpieces of varying length to a treatment area such as a paint spray booth. A photoelectric cell detects the leading edge of a workpiece and causes insertion of a ball in the start disc. Detection of the trailing edge of the workpiece by the photoelectric cell causes insertion of a ball in the stop disc. The balls are inserted in the disc by pneumatic actuators, the photoelectric cell controlling the actuators by means of a four-way valve. A series of pneumatic relay valves are mounted in circumferentially spaced relation around each disc, so as to be actuated by the balls which travel in timed relation with the workpieces. These relay valves control the starting and stopping of parts treatment devices, such as spray guns, through pneumatic controls. The invention thus provides a truly non-incremental analogue memory system for accurate turn-on and turn-off control of units such as paint applying equipment. It is adjustable for infinitely variable spray lengths and for overspray at both the leading and trailing edges of the workpiece. The system may be adapted for multiple spray locations both horizontally and vertically with the addition of only a few parts. The entire system is completely explosion proof.

BRIEF DESCRIPTION OF THE DRAWINGS

FIGURE 1 is a diagrammatic view of the entire system, showing the conveyor carrying parts into the spray booth and the synchronized memory drums;

2

FIGURE 2 is a side elevational view of the memory drum assembly; parts being sectioned;
FIGURE 3 is a cross-sectional view in elevation taken along the line 3—3 of FIGURE 2, parts being shown out of position for purposes of clarity;
FIGURE 4 is an enlarged fragmentary side elevational view of a portion of a timing disc showing one of the relay valves mounted adjacent thereto;
FIGURE 5 is a fragmentary cross-sectional view taken along the line 5—5 of FIGURE 2 and showing the adjusting mechanism for the valve mounting discs;
FIGURE 6 is a fragmentary cross-sectional view taken along the line 6—6 of FIGURE 2 showing the construction of one of the friction blocks; and
FIGURE 7 is a circuit diagram of the system.

DESCRIPTION OF THE PREFERRED EMBODIMENT

Referring to FIGURE 1, an endless conveyor 11 carries workpieces 12a, 12b, etc., into a paint spray booth 13 having three horizontally spaced spray guns 14, 15 and 16. It is desired to actuate each spray gun only when a workpiece is in front of it and only so long as the workpiece remains in front of it. Workpieces 12 have differing lengths and are placed in random sequence on the conveyor and with different spacings between them.

Two timing discs 17 and 18 are rotatable on a common axis and their rotation is synchronized with the movement of conveyor 11 by means of a shaft 19 to which they are secured and which is connected to a gear reducer 20 connected in turn to one of the pulleys 21 in the conveyor. The discs are of the type shown in the aforementioned Patent No. 3,274,852. As shown in FIGURES 2 and 3, shaft 19 is mounted within a housing 22. The shaft supports ball bearings 23 carrying valve supporting discs 24 and 25 secured to the housing by friction blocks 26, described below. These discs are circular in shape and each is alongside a timing disc and is adapted to carry circumferentially adjustable ball sensing valves 27.

Discs 17 to 18 have rubber rims 28 and 29 respectively of H shaped cross section, these annular rims fitting on the edges of the discs and having outwardly facing channels which will resiliently grip balls 31. The balls are adapted to actuate valves 27 as they pass them. As is shown in FIGURE 1, three valves 27 are provided on each valve supporting disc 24 and 25.

A ball inserting plunger 32 is mounted adjacent each disc 17 and 18, as seen in FIGURE 2. This plunger is guided in a housing 33 and is urged by a spring 34 to a retracted position in which one ball 31 is provided to enter in front of the plunger from a supply chute 35. This supply chute is fed by a ramp 36 entering the channel of rim 28 or 29 so as to pick up balls as they complete their pass around. A fluid port 37 is connected to housing 33 and fluid pressure therein will force plunger 32 toward the disc, feeding ball 31 into position.

Means are provided for independently advancing or retarding both valve supporting discs 24 and 25. This may be necessary when the conveyor is sped up or slowed down since there is an inherent delay in fluid-actuated systems which could throw off the proper timing of the actuation of spray heads 14, 15 and 16 if the conveyor velocity and therefore the disc speed does not remain constant. As shown in FIGURES 2 and 5, this adjusting mechanism comprises notches 38 cut out of both discs 24 and 25 (only the notch for disc 24 is shown) and receiving eccentric cams 39 carried by shafts 41. These shafts are rotatably mounted in the side of housing 22 at circumferentially spaced locations and carry knobs 42 with pointers 43 reading on scales (not visible on the housing. By rotating either knob 42, valve supporting disc 24 or 25 will be rotated about the axis of shaft 19 and therefore can be adjusted to compensate for speedups or slowdowns in the conveyor.

The construction of friction blocks 26 is seen in FIGURE 6. Each block is secured by a bolt 44 to housing 22 and has a pair of friction pads 45 and 46 urged apart by a spring 47. The spring pushes the pads against plates 24 and 25 respectively, so that the discs will be held in any position to which they are adjusted by cams 39.

Referring again to FIGURE 1, a photocell 48 is located a predetermined distance in advance of spray booth 13 and a light shining on this photocell will be interrupted by the workpieces 12 passing through the beam. As seen in FIGURE 7, a normally closed three-way valve 49 controls a four-way valve 51 which in turn controls the plungers 32 and 52 for start disc 17 and stop disc 18 respectively. These valves are supplied from a compressed air source 53 through a manually operated straightway valve 54 and a regulator and filter unit 55. Supply source 53 is also connected to spray units 14, 15 and 16 through another regulator and filter unit 56 and three-way valves of 57, 58 and 59 respectively. The latter three valves are air pilot-operated to either an open or a closed position as controlled by a ball sensing valve 27. More particularly, each valve 57, 58 and 59 is controlled by a first pilot 60 which urges it toward a closed position, that is, a position in which the spray head is turned off, and a second pilot 61 which, when pressurized, urges it toward an open position, operating the spray head. All the pilots are supplied from source 53 through a filter regulator assembly 62, and a restriction 63 is connected between unit 62 and each pilot 60 and 61. Valves 27 are normally closed straightway valves which are momentarily opened when a ball 31 engages the roller 64 carried by each valve 27. Each valve 27 is connected between a restriction 63 and its corresponding pilot 60 or 61. Thus, when a valve 27 operated by ball 31 carried by the start disc 17 is moved to its open position, its corresponding pilot 60 will be exhausted, and the pressure in pilot 61 will cause valve 57 to shift to an open position, actuating the corresponding spray head.

In operation, valve 54 will be moved to its open position, and three spray guns 14, 15 and 16 will be enabled by moving corresponding manual straightway valves 65, 66 and 67 to their open positions. Plunger 52 will be extended and plunger 32 retracted. Both plungers are urged to their retracted positions by springs 68.

When conveyor 11 is driven, discs 17 and 18 will rotate in synchronism with the advance of the conveyor. As disc 18 rotates, the ball 31 carried by it will momentarily actuate in succession the three sensing valves 27 carried by disc 25. This will momentarily exhaust all three pilots 61, thus insuring that all the spray guns are off.

After a workpiece 12 is loaded on the conveyor, its leading edge will eventually interrupt the light beam. This will shift valve 49 to its open position, actuating valve 51 rightwardly from the position shown in FIGURE 7. This will pressurize plunger 32 and inject a ball 31 onto start disc 17. It will also permit retraction of plunger 52 so that another ball 31 may be placed in position for loading onto disc 18.

As the trailing edge of the workpiece leaves the light beam, valve 49 will again be shifted rightwardly to its closed or exhaust position. This will permit leftward shifting of valve 51, and plunger 52 will inject a ball 31 onto stop disc 18 while plunger 32 is retracted, permitting another ball 31 to be ready for insertion onto start disc 17.

As the workpiece approaches spray gun 14, the ball 31 which was injected onto the start disc 17 when the leading edge of the workpiece broke the light beam will momentarily open the sensing valve 27 corresponding to spray gun 14. This will momentarily exhaust pilot 60 so that pilot 61 will shift valve 57 for spray gun 14 to its open position, operating the spray gun. It should be noted that because of the synchronism above described, and the adjustability of valves 27, the spray gun can be started just as the leading edge of the workpiece comes into the spray area.

Similarly, as the trailing edge of the workpiece leaves the area of spray gun 14, the ball 31 which was injected onto stop disc 18 will momentarily open the sensing valve 27 corresponding to spray gun 14. This will momentarily exhaust pilot 61 of valve 57 and since pilot 60 is now pressurized, valve 57 will be shifted to its closed position, shutting down the spray gun.

The operation of spray guns 15 and 16 will be similar to that for spray gun 14, sensing valves 27 being clamped to discs 17 and 18 in circumferentially adjusted positions corresponding to the positions of the guns.

It will thus be seen that the spray guns can all be operated in direct dependence on the width of the workpieces and in accordance with the positions of the workpieces as they enter the spray booth and pass the spray guns. All the control elements are pneumatically operated and explosion proof.

What is claimed is:

1. In combination, a conveyor for workpieces of varying lengths moving toward a treatment area, a pair of timing discs rotating in synchronism with the movement of said conveyor, means on the peripheries of said discs for carrying balls, means adjacent each disc for injecting a ball onto the periphery thereof, means responsive to arrival of the leading edge of the workpiece at a predetermined point in advance of said treatment area to actuate said means for injecting to inject a ball on the first disc, means responsive to arrival of the trailing edge of said workpiece at the same predetermined point to actuate said means for injecting to inject a ball on the second disc, pneumatic sensing valves mounted adjacent the peripheries of said discs, treatment means at said treatment area, means responsive to momentary actuation of the sensing valve adjacent said first disc for starting said treatment means, means responsive to momentary actuation of the sensing valve adjacent said second disc for stopping said treatment means, the sensing valves being actuatable by balls on the disc peripheries passing thereunder, and means for circumferentially adjusting each sensing valve whereby the workpiece will be treated as it passes said treatment means.

2. The combination according to claim 1, said means responsive to momentary actuation of said sensing valves comprising pilot-operated valves.

3. The combination according to claim 2, further provided with a source of compressed air for said pilot-operated valves, each pilot-operated valve having a pilot at each end, a restriction between said source and each of said pilots, each sensing valve comprising a normally closed straightway valve connected between a restriction and its corresponding pilot.

4. The combination according to claims 1 or 3, said means responsive to the arrival of said workpiece edges at a predetermined point comprising a photocell, said means for injecting balls onto the periphery of said discs comprising air-operated plungers, and pneumatic valve means controlled by said photocell and movable between a first position extending one of said plungers and permitting retraction of the other plunger, and a second position reversing the position of said plungers.

5. The combination according to claim 4, each of said plungers being pressure-actuatable to its extended position and spring-returnable to its retracted position, said valve means comprising a four-way valve controlling the position of the plungers and a three-way valve controlled by said photocell and controlling said four-way valve.

References Cited

UNITED STATES PATENTS

| | | | |
|---|---|---|---|
| 2,675,778 | 4/1954 | Peeps | 118—2 |
| 2,900,950 | 8/1959 | Peeps | 118—2 |
| 2,971,492 | 2/1961 | Enssle | 118—1 X |
| 3,013,445 | 12/1961 | Enssle. | |
| 3,057,224 | 10/1962 | Svaty et al. | |
| 3,151,500 | 10/1964 | Kurz. | |
| 3,255,037 | 6/1966 | Knight et al. | 118—2 X |
| 3,274,852 | 9/1966 | Ebbert | 74—568 |

MORRIS KAPLAN, Primary Examiner

U.S. Cl. X.R.

74—568; 198—40